Nov. 9, 1943.  C. L. CONNERS  2,333,703
WEIGHING SCALE
Filed Sept. 29, 1941  4 Sheets-Sheet 2

INVENTOR
CARL L. CONNERS
BY
ATTORNEYS

Nov. 9, 1943.　　　　C. L. CONNERS　　　　2,333,703
WEIGHING SCALE
Filed Sept. 29, 1941　　　　4 Sheets-Sheet 3
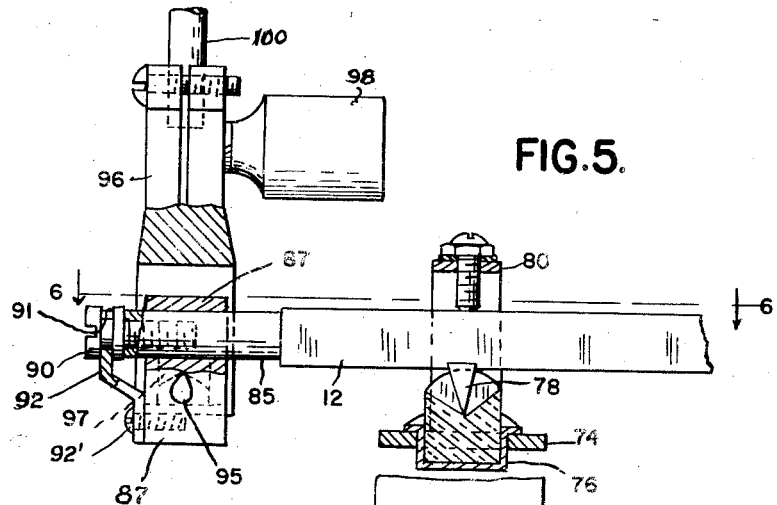
FIG. 5.
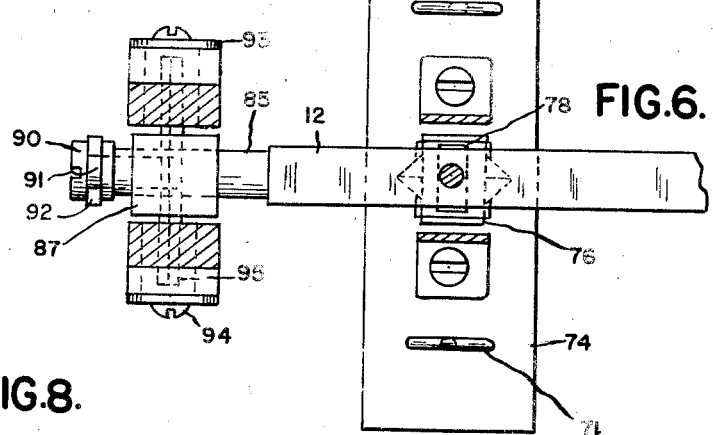
FIG. 6.
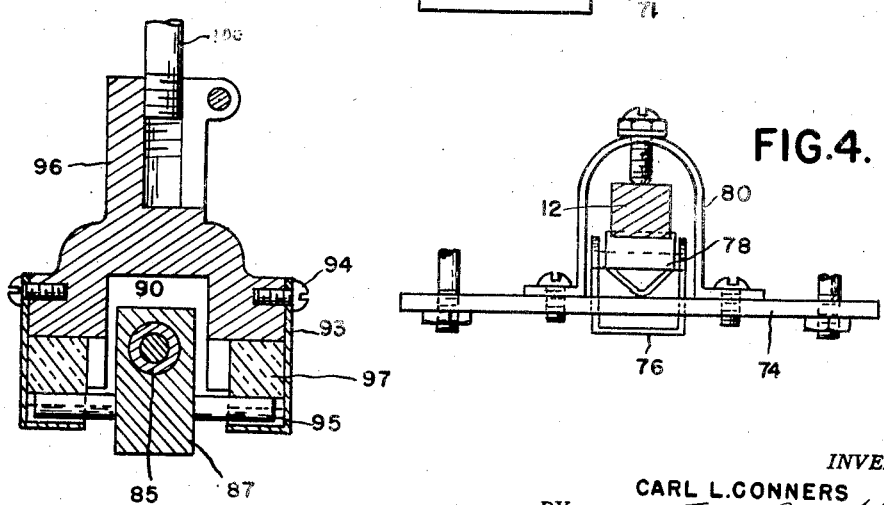
FIG. 8.
FIG. 4.
INVENTOR.
CARL L. CONNERS
BY
ATTORNEYS Nov. 9, 1943.    C. L. CONNERS    2,333,703
WEIGHING SCALE
Filed Sept. 29, 1941    4 Sheets-Sheet 4
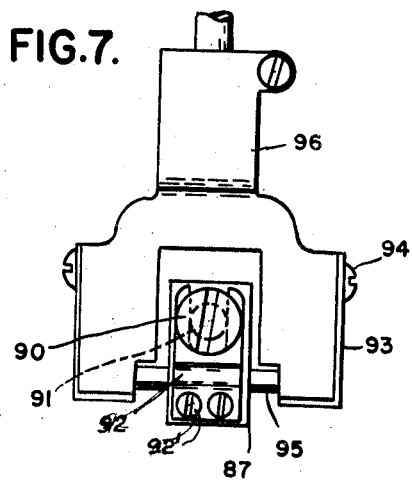
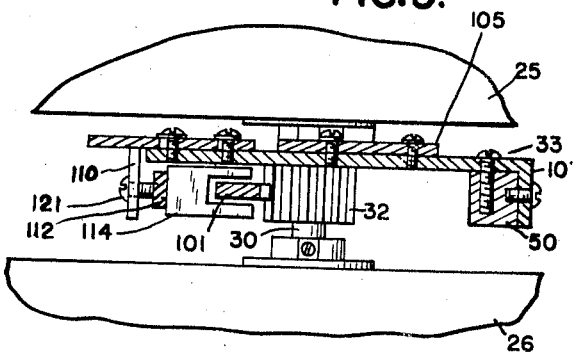
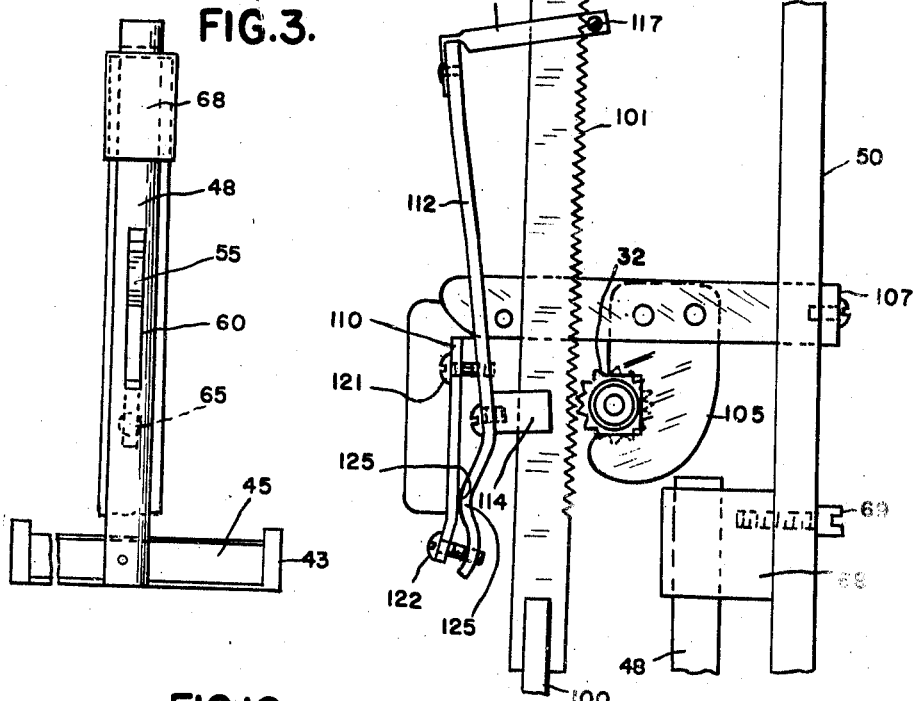
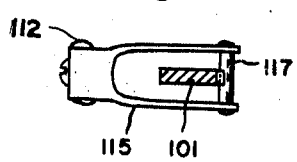
INVENTOR
CARL L. CONNERS
BY
ATTORNEYS Patented Nov. 9, 1943

2,333,703

UNITED STATES PATENT OFFICE 2,333,703

WEIGHING SCALE

Carl L. Conners, Louisville, Ky., assignor to Walter F. Stimpson, Louisville, Ky.

Application September 29, 1941, Serial No. 412,774

4 Claims. (Cl. 265—68)

This invention relates to weighing scales, and particularly to computing scales of the cylinder type, contemplating among its principal objects the provision of improved means for supporting and guiding the counterbalancing springs and the weight indicating mechanism, as well as the improvement and simplification of the indicator actuating mechanisms of such scales.

An important object of the invention is also to provide new and improved means for adjusting the position of the lower end of the rack rod with respect to the nose iron, which means permits quick and easy adjustment of the capacity of the scale, yet fastens the lower end of the rack rod in a secure manner adapted to prevent accidental disalignment thereof while nevertheless affording efficient and virtually frictionless connection between the nose iron and rack rod.

Still another object is to provide improved means for attaching the springs to the nose iron, and for suspending the springs from the fixed support by which they are carried, the latter means being so arranged that zero adjustment of the scale may conveniently be made by raising or lowering the spring support, yet the springs are freely suspended and swingable in a manner which insures permanent maintenance of proper alignment.

Still another object is to provide improved rack rod guiding means incorporating novel means whereby the rack rod may be moved to a disengaged position at will, as for example when the scale is to be shipped or moved, in which disengaged position the teeth of the rack rod are separated from those of the pinion so that both are protected against accidental injury or wear due to vibration.

An object related to that last stated is to provide such disengaging mechanism for the rack rod which is of very simple and inexpensive construction, and which is easily and quickly operable and readily accessible, the nature of these parts being such that the ordinary user of the scale is able to disengage the rack rod, and thus protect the accuracy of these parts, whenever the scale is to be moved.

Other objects and advantages will be apparent to those skilled in the art upon reference to the following description and the accompanying drawings, in which Figure 1 is a rear elevational view of a weighing scale incorporating the principles of the present invention, certain parts of the casing and of the chart assembly being broken away to afford a better view of the working elements.

Figure 2 is a substantially central longitudinal vertical section taken substantially on the line 2—2 of Figure 1 and looking in the direction of the arrows.

Figures 3 and 4 are detail vertical sections taken substantially on the lines 3—3 and 4—4 respectively of Figure 2.

Figure 5 is a detail vertical section taken substantially on the line 5—5 of Figure 1.

Figure 6 is a horizontal section taken substantially on the line 6—6 of Figure 5.

Figure 2:
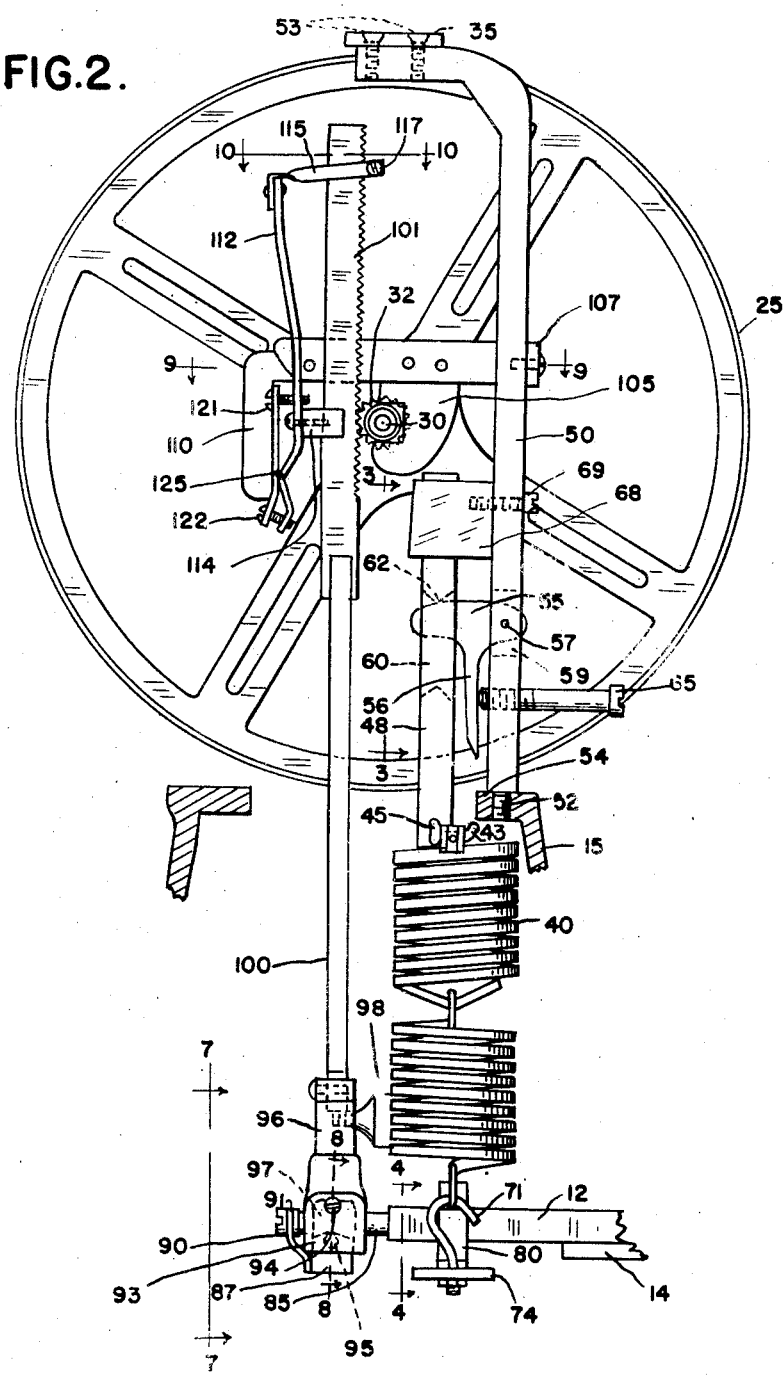

Figures 7 and 8 are detail vertical sections taken substantially on the lines 7—7 and 8—8 respectively of Figure 2.

Figure 1:
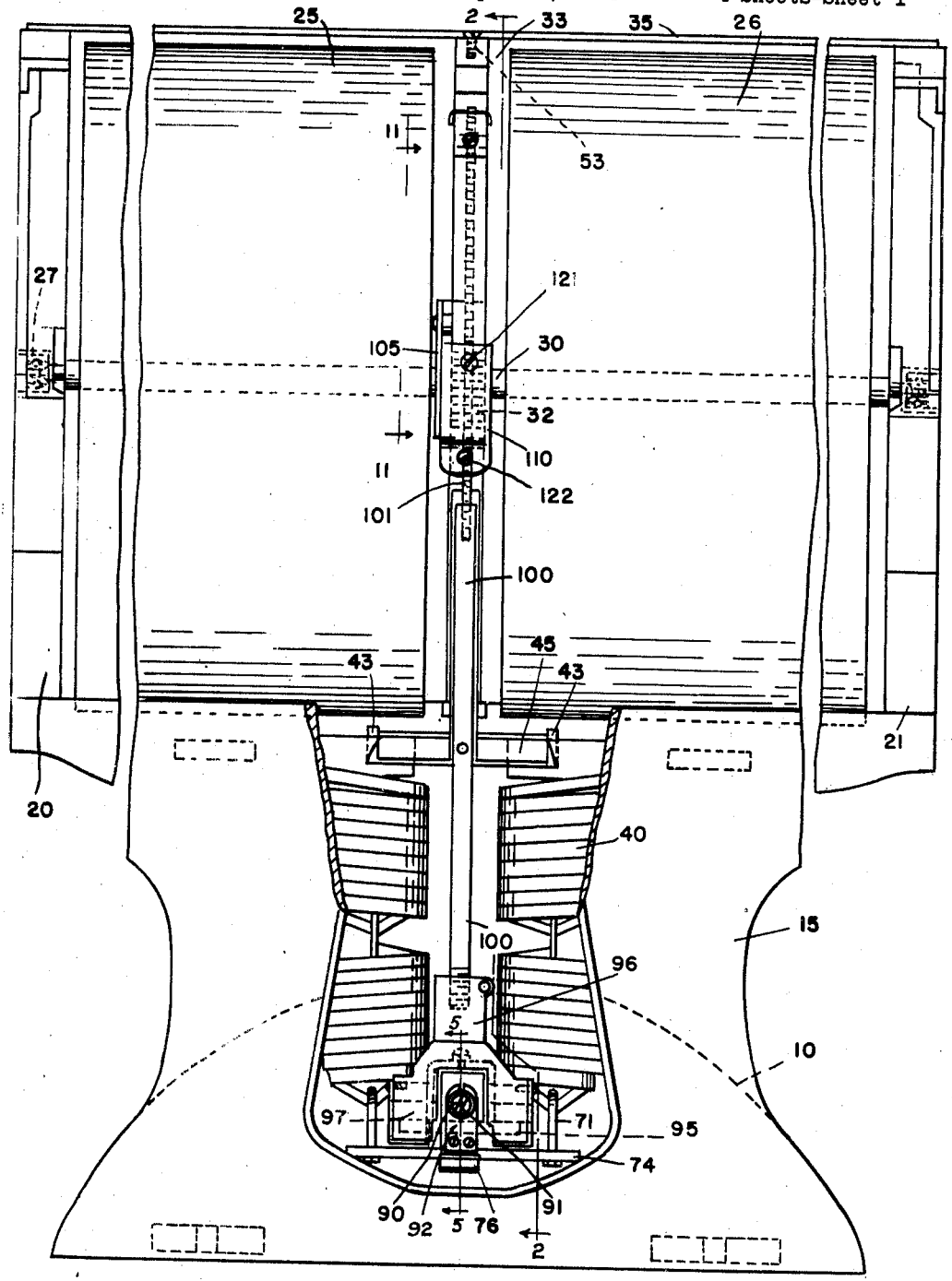

Figures 9 and 10 are detail horizontal sections taken on the lines 9—9 and 10—10 respectively of Figure 2, and Figure 11 is a detail vertical section taken substantially on the line 11—11 of Figure 1.

Referring now to the drawings, reference character 10 indicates the base of my improved scale, within which is housed the counterbalancing lever mechanism. The lever mechanism may be of the usual or any desired variety, forming in itself no part of my present invention, only the nose iron portion 12 and a portion of the main lever 14 being illustrated.

Upstanding at the rear of the base is a rigid hollow column 15, carrying at its top a transversely disposed substantially cylindrical chart-supporting framework including end frame portions 20, 21, in which the chart shaft 30 is journaled, as by means of anti-friction bearings 27. The chart is formed in two sections, 25, 26, centrally spaced from one another to provide a gap 33 and fast upon shaft 30, which also carries the pinion 32, fixed thereupon in alignment with the gap 33. The two end frames 20, 21 are connected at their tops by a tie bar 35.

The counterbalancing springs 40, of the thermostatic type, are suspended at their tops in hooks 43, the hooks being carried by and at the ends of a cross arm 45, rigidly attached to a vertically adjustable spring supporting slide bar 48. Bar 48 projects upwardly into the gap and downwardly into the hollow column 15. A fixed and rigidly mounted spring supporting and guide post 50 carries the slide bar 48, being provided at its lower extremity with a stud 52 threaded into a suitably tapped opening in lug 54 integral with and projecting inwardly from the top of the column. At its upper end the spring post 50 is attached, as by screws 53, to the tie bar 35. An adjustable spring supporting cam 55, pivoted as at 57 in a slot 59 in the post 50, projects into a slot 60 in the slide bar 48 and underlies the pointed upper extremity 62 of the last mentioned slot to provide substantially one point suspension. Arm 56, integral with cam 55 extends downwardly in the space between the bar 48 and post 50, an adjusting screw 65 threaded in the post being arranged to bear against the arm 56 in such manner that by turning the screw, the spring carrying slide bar, and accordingly the upper ends of the springs, may be moved up and down to afford zero adjustment. At its upper end the slide bar is guided by the block 68, in which it is slidable, the block being attached to post 50 by means of a single screw as 69, which permits slight rocking of the block about the axis of the screw, insuring proper alignment of the spring supporting bar with respect to the line of tension of the springs. To permit such lateral movement, the slot 60 is made somewhat wider than the thickness of cam 55.

At their lower ends the springs are connected by hooks 71 to a steelyard plate 74, which extends transversely beneath the nose iron 12, carrying therebeneath an agate bearing block 76 in which rests a knife edge pivot 78 projecting from the bottom of the nose iron. A sheet metal loop 80 attached to the steelyard plate loosely encircles the nose iron, a removable screw extending downwardly through the top of the loop acting to prevent the pivot from jumping out of the block but permitting disassembly of these parts, and removal of the steelyard assembly from the nose iron, when the screw is removed.

The terminal portion 85 of the nose iron is turned to cylindrical contour and a slide block 87 is slidably fitted thereupon for longitudinal movement toward and from the axis of the main lever. A screw 90 threaded in a hole (undesignated) axially tapped in the cylindrical end 85 of the nose iron, is provided with a head having a circumferential slot 91 in which fits a yoke 92 attached as by screws 92' to the block 87, the screw 90 being rotatable in the slotted end of the yoke, and these parts being accurately fitted to prevent lost motion. This arrangement will be seen to be such that when the screw is turned, the block 87 is moved longitudinally along the cylindrical portion of the nose iron.

Projecting from opposite sides of the slide block 87 are upwardly directed knife edge pivot portions 95 adapted to support the rack rod assembly 100. The rack rod assembly is attached at its lower end to a bifurcated connector block 96, which extends downwardly upon opposite sides of the slide block 87 and carries bearing members 97 formed of inverted V-blocks, of agate or the like, resting upon the pivots 95 to support the rack rod assembly in a manner permitting free and unrestricted angular movement between this assembly and the main lever. The sides of the connector block 96 and the bearing members 97 are covered by right-angled end plates 93, secured, as by screws 94, to the connector block, the lower portion of such end plates being normally spaced from but in juxtaposition to the pivots 95, as best shown in Figures 7 and 8. The rack rod assembly is overweighted, as by means of the weight 98, which urges the upper rack toothed portion 101 into engagement with the chart pinion 32.

Adjacent the pinion 32 and backing the shaft 30 upon its side opposite the rack is a sheet metal guard 105, arranged to insure against any such flexing of the shaft as might permit the rack and pinion to jump or skip teeth with relation to each other. The guard is attached to a bracket 107 fastened to the post 50 and projecting rearwardly through the gap between the chart sections and over the shaft. An extension bracket 110 attached to bracket 107 extends downwardly behind the rack 101 and carries the support 112 for the rack guides 114—115, through which the rack is freely slidable. The lower guide 114 is a simple bifurcated clip, arranged to prevent unwanted lateral movement of the rack rod, while the upper guide 115 is in the form of a sheet metal loop which, when the scale is arranged for normal operation, loosely encircles the upper end of the rack. The form of the upper guide is best shown in Figures 10 and 11. As there indicated, it is constructed as a sheet metal fork, the ends of which are connected by a short cross rod 117. The cross rod is preferably surfaced with fiber or other relatively soft material, to prevent injury to the rack teeth. The support 112 is attached to the bracket 110 by means of screws 121—122 vertically spaced from one another in such manner that by tightening one of these screws and loosening the other, the upper guide 115 may be moved toward the front or rear. When the guide 115 is moved far enough to the rear, the cross rod 117 engages the toothed face of the rack, and draws it to the rear and out of engagement with the pinion. This permits shipping and handling of the scale with the parts out of mesh, effectively guarding them against the undue injury and wear which occur at such time if the rack and pinion remain in mesh, due to the unavoidable vibration. To place the parts in service it is only necessary to reverse the rotation of the screws 121, 122, and move the guide forwardly far enough to allow the rack again to mesh. The guide 115 is at such time moved far enough to the front to effectively back the rack and guard it against jumping with relation to the pinion.

Between the screws 121, 122, the guide support is bent angularly rearwardly, toward the generally parallel screw-carrying face of the angular extension bracket 110, and thence again outwardly, to provide a rocking fulcrum 125 for the swingable guide support as well as an abutment permitting the screws 121, 122 to be tightened, to rigidly lock the guide support in place, without the necessity of employing screw locking expedients or the like. Thus these screws may be easily manipulated at any time, but hold the guides firmly in place when tightened.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In a weighing scale, a main lever, a nose iron portion carried thereby and having a substantially cylindrical longitudinally extending terminal portion, a bearing block slidably and rotatably carried by said cylindrical portion, means reacting against said block and nose iron for moving the block longitudinally of the nose iron, and bearing means operatively interconnected with said block and extending upon opposite sides thereof and adapted to support an indicator actuating element for rocking movement about an axis transverse with respect to said nose iron.

2. In a weighing scale having a base, a main lever carried thereby and rockable about a transverse axis, a rigid hollow column upstanding from the base, chart supporting means carried by the upper end of and interiorly connected with said column, indicating means rotatable in said supporting means, counterbalancing spring means, means for supporting the upper end of said spring means from the interior of the column near the top thereof including a vertically slidable hanger assembly connected to and extending upwardly from the spring means, a support for said hanger, means for adjusting said support vertically, said support permitting lateral rocking movement of the hanger, and guide means for said hanger arranged above said support and permitting limited lateral rocking movement of said hanger.

3. In a weighing scale, in combination with load off-setting means, and weight indicating means, indicator actuating means connecting the load off-setting means and weight indicating means comprising a rack and pinion, the rack being movable toward and from the pinion into and out of mesh therewith, guide means normally preventing unwanted movement of the rack out of mesh with the pinion, said guide means including a yoke member encircling the rack, and means for moving the yoke member toward and from the normal path of movement from the rack when in mesh with the pinion, whereby the rack may be moved away from the pinion or allowed to mesh therewith at will, said last-mentioned means including a member carrying said guide means and extending substantially parallel to said rack upon the opposite side thereof from said pinion, and means supporting said last mentioned member including a support and a pair of screw threaded elements engaging the support and said member, said screw threaded elements engaging said member at points spaced from one another and spaced from said guide means, but located upon the same side of the latter, whereby by turning said screw threaded elements in directions to move the points of connection thereof to said member toward and from the rack, the guide means may be moved, to thereby move the rack to and from its position of mesh.

4. In a weighing scale, in combination with load offsetting means, weight indicating means, indicator actuating means connecting the load offsetting and weight indicating means, comprising a pinion connected to said weight indicating means, a rack connected to said load offsetting means and normally meshing with said pinion, means normally urging said rack into mesh with said pinion, and means for unmeshing the rack with respect to the pinion, comprising a support having apertures at spaced points along a line substantially parallel to the line of movement of the rack, a pair of screws passing through said apertures, an elongated carrier having tapped holes into which said screws are threaded and supported thereby, said carrier being formed with a fulcrum portion contacting said support between said screws extending longitudinally away from said screws substantially in a line generally parallel to said line of movement of the rack, a guide carried by said carrier at a point spaced from both of said screws and on the same side of the latter, said guide embracing the rack and being movable by manipulation of said screws transversely of said line of movement, said guide when so moved being engageable with the rack to induce movement of the latter to and from mesh with the pinion.

CARL L. CONNERS.